United States Patent [19]

Suzuki

[11] Patent Number: 5,737,633
[45] Date of Patent: Apr. 7, 1998

[54] SERIAL DATA RECEIVING DEVICE HAVING A MEMORY FOR STORING A RECEPTION PERMIT SIGNAL WHICH ENABLE OR DISABLE THE DEVICE FROM HANDSHAKING WITH THE TRANSMITTING DEVICE

[75] Inventor: Katsunori Suzuki, Itami, Japan

[73] Assignee: Mitsubishi Denki Kabushiki Kaisha, Tokyo, Japan

[21] Appl. No.: 550,325

[22] Filed: Oct. 30, 1995

[30] Foreign Application Priority Data

Nov. 30, 1994 [JP] Japan .................... 6-297393

[51] Int. Cl.⁶ .................................................. G06F 13/00
[52] U.S. Cl. ............... 395/849; 395/200.67; 395/557; 395/854; 395/891; 375/316; 375/351; 375/354; 375/369; 377/77; 377/94; 377/107
[58] Field of Search ................... 341/50; 370/458; 371/67.1; 375/354, 316, 351, 369; 377/77, 94, 107; 380/42; 395/551, 842, 200.67, 557, 849, 854, 891

[56] References Cited

U.S. PATENT DOCUMENTS

| | | | |
|---|---|---|---|
| 4,087,626 | 5/1978 | Brader | 380/42 |
| 4,118,791 | 10/1978 | Swain | 341/50 |
| 4,663,730 | 5/1987 | Ikeda | 364/140 |
| 4,692,859 | 9/1987 | Ott | 340/825.65 |
| 4,775,990 | 10/1988 | Kamuro et al. | 377/77 |
| 4,829,471 | 5/1989 | Banerjee et al. | 395/250 |
| 4,989,135 | 1/1991 | Miki | 395/842 |
| 5,127,002 | 6/1992 | Shaik et al. | 370/458 |
| 5,199,107 | 3/1993 | Ozawa | 395/551 |
| 5,220,585 | 6/1993 | Sasaki et al. | 375/354 |
| 5,414,721 | 5/1995 | Fukui | 371/67.1 |

FOREIGN PATENT DOCUMENTS 5-091146  4/1993  Japan .

Primary Examiner—Thomas C. Lee
Assistant Examiner—Po C. Huang
Attorney, Agent, or Firm—Lowe, Price, LeBlanc & Becker

[57] ABSTRACT

A serial data receiving device comprises a first memory means for storing serial data while shifting the data bit by bit whenever receiving each one bit of the data and converting the serial data into parallel data when all the bits constituting the serial data are stored; a first detecting means for detecting the storage of all the bits constituting the serial data in the first memory means, a second memory means for storing a signal allowing the serial data to be received in accordance with the detection result by the first detecting means, and a first control means for controlling the reception of the serial data (outputting a hand-shake signal or transfer clock, for example) in accordance with the stored contents in the second memory means. A serial data transfer apparatus is equipped with the serial data receiving device, wherein the receiving device controls the transfer of the serial data.

12 Claims, 15 Drawing Sheets

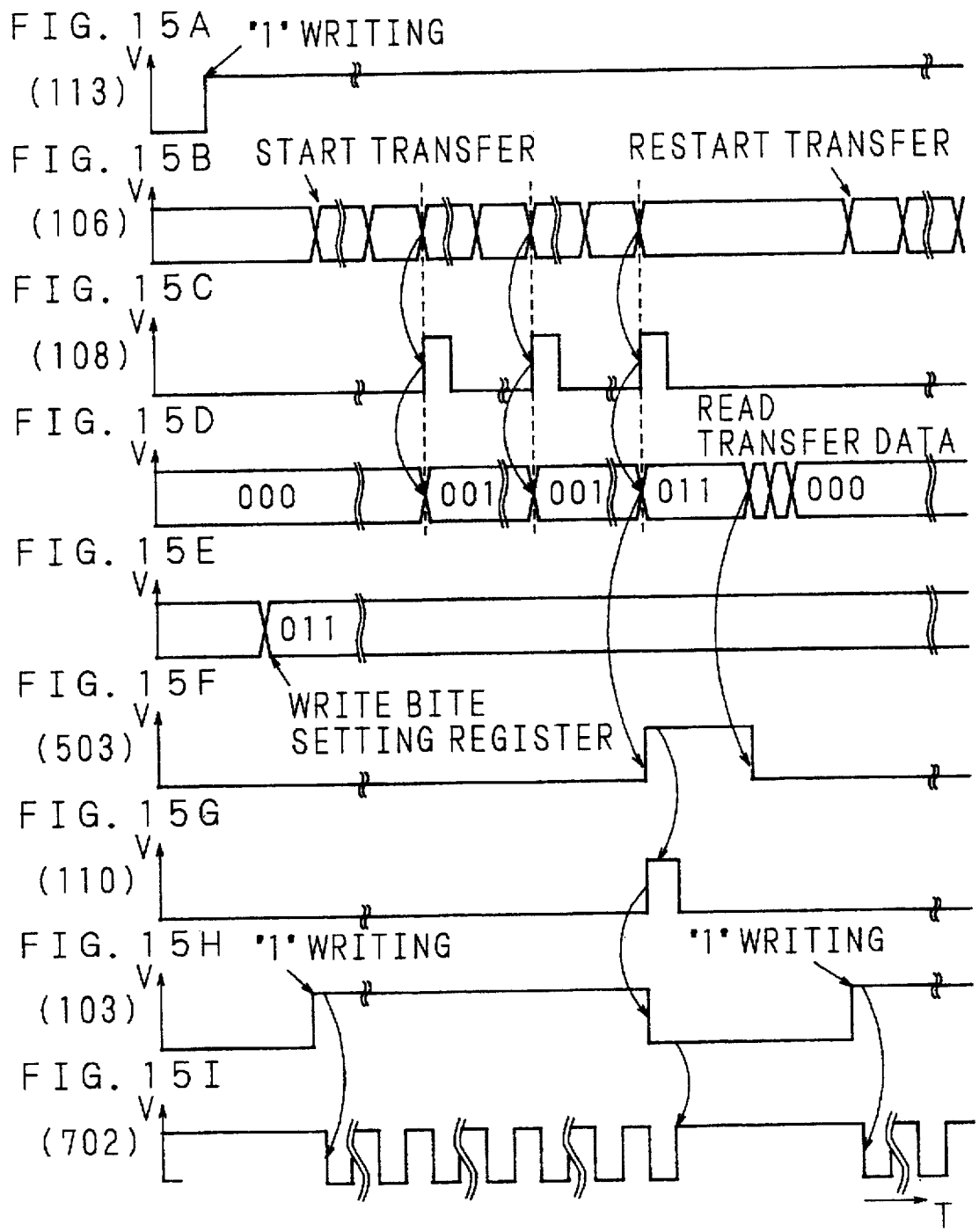

SERIAL DATA RECEIVING DEVICE HAVING A MEMORY FOR STORING A RECEPTION PERMIT SIGNAL WHICH ENABLE OR DISABLE THE DEVICE FROM HAND-SHAKING WITH THE TRANSMITTING DEVICE

BACKGROUND OF THE INVENTION

1. Field of the Invention

The present invention relates generally to a serial data receiving device for receiving serial data transferred in a bit-serial manner, and more particularly to a serial data transfer apparatus provided with the same.

2. Description of Related Art

A known serial data receiving device becomes ready to receive transfer data when a reception permit flag is set, and outputs a hand-shake signal (request to send: RTS) to a transmitting device so as to request the transfer of data. When the transmitting device sends the data in response to the RTS, the receiving device starts to receive the transfer data. The reception permit flag and the RTS signals are outputted by setting bits in a particular register in accordance with a particular program. When the reception permit flag and the RTS signals are reset, the reception of signals by the receiving device is suspended.

FIG. 1 is a block diagram showing a main portion of an M5M82C51 of a data communication IC. This device is illustrated as an example of the above-mentioned known serial data transfer apparatus, which is equipped with both a receiving function and a transmitting function. FIG. 2 shows the structure of mode instructions in the M5M82C51, and FIG. 3 shows the structure of commands in a modem control circuit within the M5M82C51.

The M5M82C51 which is a data communication IC device includes a read/write control circuit 901 which reads an instruction from a program and writes the same in each of the control circuits in the IC; a modem control circuit 902 for controlling a modem in accordance with the program; a data bus buffer 903 for adjusting the delivery of data to a data bus; a transmission buffer 904 for adjusting a transmission speed by converting parallel data into serial data in transferring of the data; a transmission control circuit 905 for controlling the operation of the transmission buffer 904; a reception buffer 907 for adjusting a receiving speed by converting the serial data into parallel data when the device receives the serial data; and a reception control circuit 906 for controlling the operation of the reception buffer 907.

In a chart of mode instructions (FIG. 2) of the M5M82C51 there are arranged from upper digits a 2-bit 1001 for designating the length of a stop bit, a 1-bit 1002 for designating "even" or "odd" for effecting a parity check, a 1-bit 1003 for designating the enabling or disenabling of the parity, a 2-bit 1004 for designating the length of characters, and a 2-bit 1005 for designating the frequency division of a baud rate (modulation rate).

In a chart of commands (FIG. 3) of the modem control circuit 902, the commands consist of from upper digits a bit 1101 for designating a hunt mode (hunting line), a bit 1102 for designating the internal resetting of the modem control circuit 902, a bit 1103 for designating the control of a transmitting carrier (RTS), a bit 1104 for resetting an error, a bit 1105 for designating the supply of a break character whereby a process is forcibly suspended to return to the original state, a bit 1106 for designating enabling of the reception, a bit 1107 for designating a data-terminal-ready, and bits 1108 for designating enabling of the transmission.

The serial data transfer apparatus constructed in the above-described way, especially the receiving operation thereof in an synchronous communication will be described below.

First, the serial data receiving device executes the mode instructions (FIG. 2) prior to starting of the reception. More specifically, the bit 1001 designating the length of the stop bit, the bit 1002 designating a parity check, the bit 1003 designating enabling/disenabling of the parity, the bit 1004 designating the length of characters, and the bit 1005 designating the frequency division of the baud rate are set.

Then, the serial data receiving device executes the commands (FIG. 3). More specifically, the bit 1106 designating enabling of the reception, and the bit 1103 designating the control of a transmitting carrier are set. Consequently, the RTS signal is sent to the transmitting device, so that the serial data receiving device is prepared to receive transfer data. When a start bit is inputted to an RXD terminal of the reception buffer 907, the reception control circuit 906 detects the fact, and the serial data receiving device starts to receive the data. The RXD terminal of the reception buffer 907 continues to receive the serial data from the transmitting device, and receives the stop bit last. Upon receipt of the stop bit at the RXD terminal of the reception buffer 907, the reception control circuit 906 detects the receipt, and the serial data receiving device thus completes the receiving operation. The received data are converted from serial data into parallel data in the reception buffer 907, which are then inputted to a reception data bus buffer in the data bus buffer 903.

However, in the known receiving device the RTS signals are continuously sent to the transmitting device unless the bit 1106 designating enabling of the reception and the bit 1103 designating the control of a transmitting carrier are reset. As a result, transfer data are successively inputted to the receiving device irrespective of the state of the device. In order to solve this problem, although it is required to suspend the data transmission under the control by the receiving device through execution of a command in accordance with a specific program, the command must be instantly executed before the next data are delivered.

SUMMARY OF THE INVENTION

The present invention has been devised to solve the problems discussed above, and a principal object of the present invention is to provide a serial data transfer apparatus in which a receiving device controls the transmission of data in accordance with the conditions of the data reception thereof thereby to forcibly suspend the delivery for every serial data while a programmed operation of the device is not forced to stop. And it is to provide a serial data receiving device having a function for controlling the transmission of data.

According to one aspect of the present invention, a serial data receiving device includes a first memory means which stores serial data after shifting the data bit by bit every time one bit of the data is inputted thereto and converts the serial data into parallel data when all the bits constituting the serial data are stored, a first detecting means which detects that all the bits of the serial data are stored in the first memory means, and a first control means which controls the reception of the serial data in accordance with the detection result by the first detecting means, thereby to control the transfer of the serial data.

The first control means is a first signal generating means which generates, for examples, a signal for hand-shaking with a transmitting device.

In the case where the receiving device is so constituted that, the first control means includes a second signal generating means which generates a transfer clock for transferring the serial data, the receiving device can receive the serial data synchronously with the transfer clock.

The detection result of the first detecting means may be sent to the first control means in a construction as follows.

A second memory means is additionally provided to store a reception permit signal for the serial data, which is set or reset in accordance with the detection result by the first detecting means, so that the first control means controls the reception of the serial data in accordance with stored contents in the second memory means.

A third memory means controlled by a second control means in accordance with the detection result by the first detecting means may also be provided to store the parallel data obtained at the first memory means, so that the second memory means stores the reception permit signal for the serial data in accordance with a code based on a count value of the number of the parallel data stored in the third memory means.

A preset number of parallel data is stored in a fourth memory means, and the count value of the number of parallel data and the stored contents in the fourth memory means are compared by a comparing means, thereby enabling the second memory to store the reception permit signal for the serial data on the basis of the result of the comparison.

The above and further objects and features of the invention will more fully be apparent from the following detailed description with the accompanying drawings.

BRIEF DESCRIPTION OF THE DRAWINGS

FIG. 15A is a timing chart of data in a single mode bit in EMBODIMENT 4;

FIG. 15B is a timing chart of transfer data in EMBODIMENT 4;

FIG. 15C is a timing chart of a reception finish signal in EMBODIMENT 4;

FIG. 15D is a timing chart showing the number of bytes counted by a reception buffer counter in EMBODIMENT 4;

FIG. 15E is a timing chart showing the number of bytes set in a byte setting register in EMBODIMENT 4;

FIG. 15F is a timing chart of a matched signal in EMBODIMENT 4;

FIG. 15G is a timing chart of a reception permit reset signal in EMBODIMENT 4;

FIG. 15H is a timing chart of a reception permit signal in EMBODIMENT 4; and

FIG. 15I is a timing chart of a transfer clock in EMBODIMENT 4.

DESCRIPTION OF THE PREFERRED EMBODIMENTS

In the following explanation will be made in detail on the present invention referring to drawings showing the embodiments thereof.

EMBODIMENT 1

Figure 1:
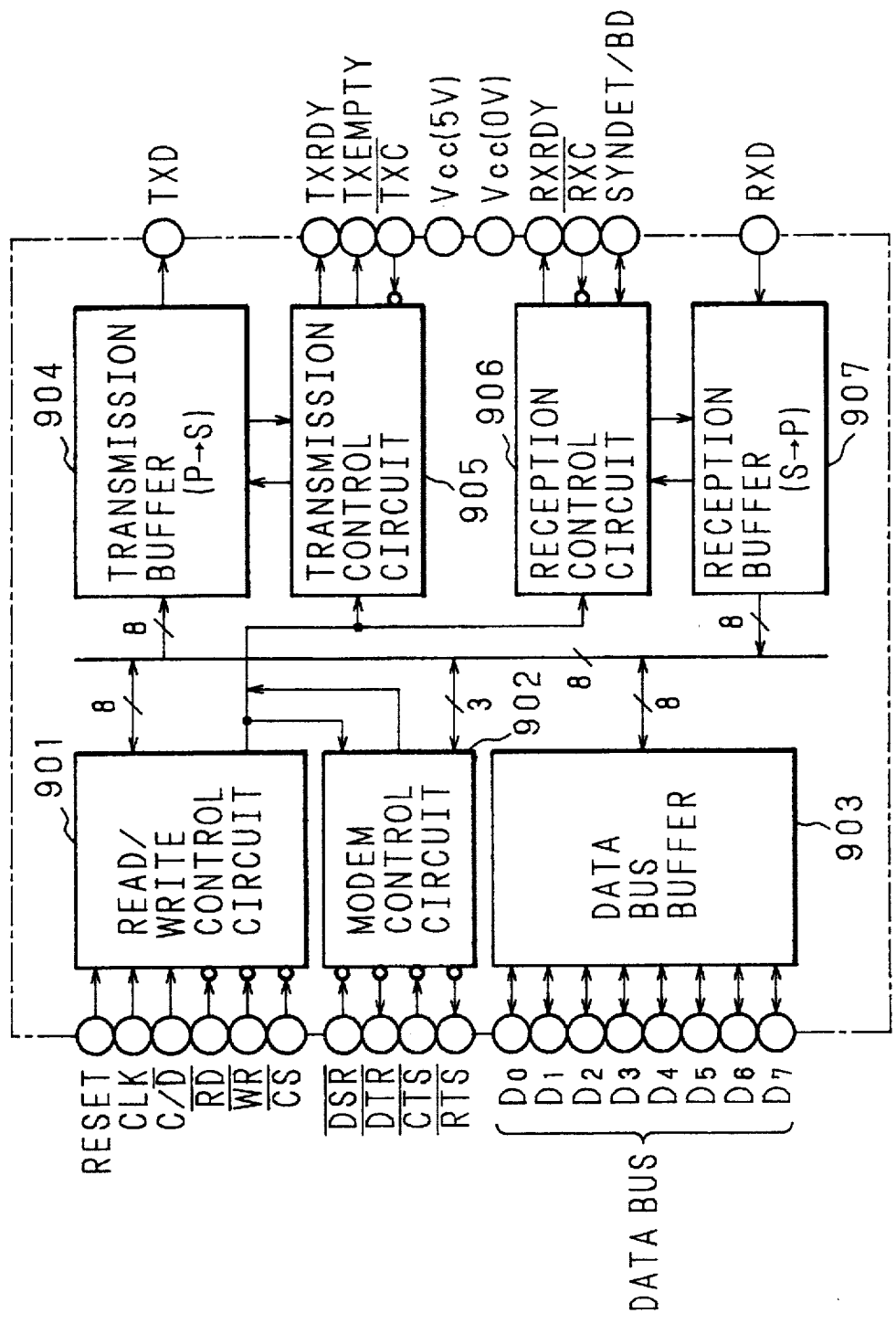
FIG. 1 is a block diagram showing a main portion of the structure of a conventional serial data receiving device.
Figure 2:
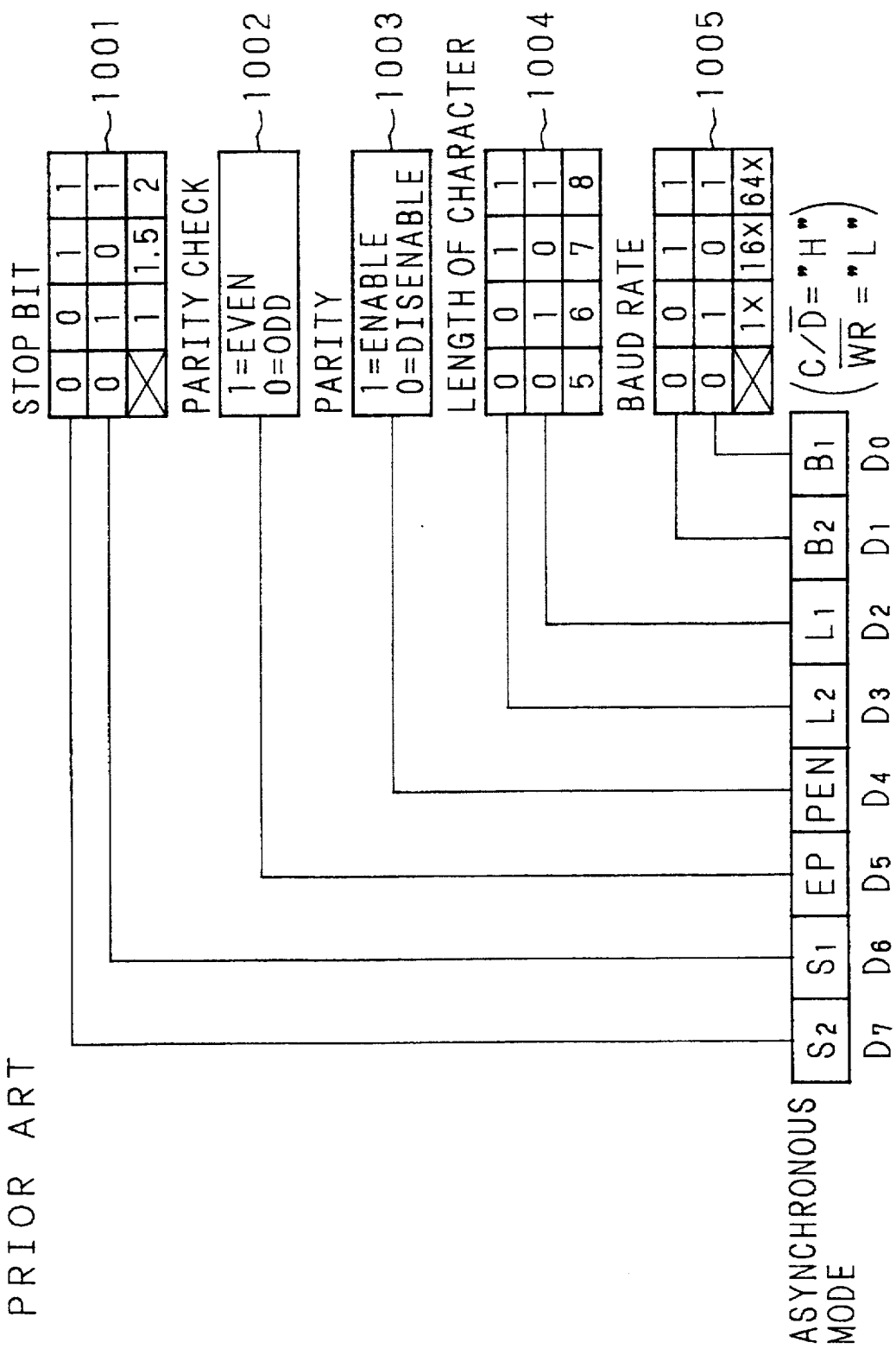
FIG. 2 is a diagram showing the constitution of mode instructions in the serial data receiving device shown in FIG. 1.
Figure 3:
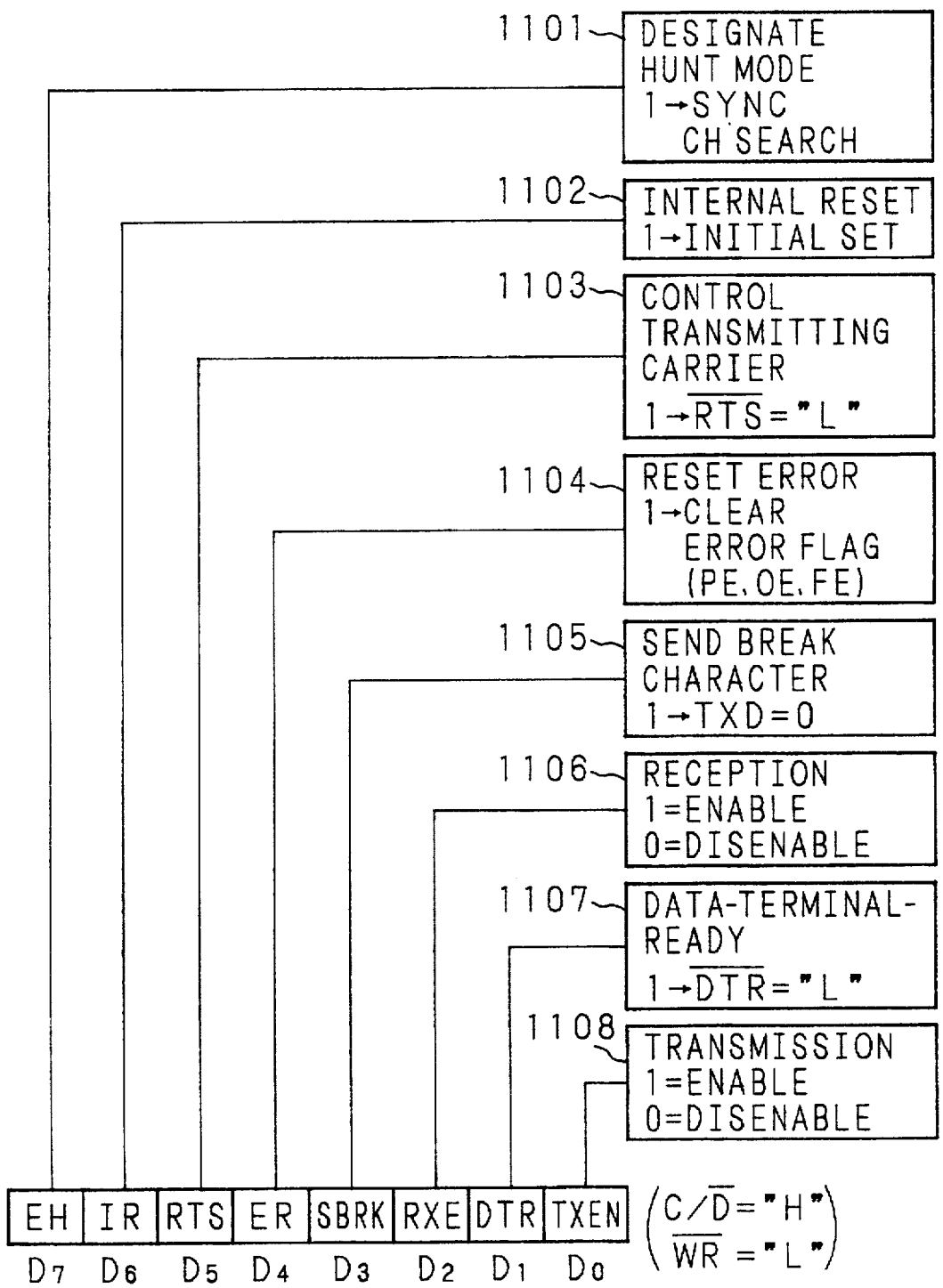
FIG. 3 is a diagram showing the structure of commands in a modem control circuit of the serial data receiving device shown in FIG. 1.
Figure 4:
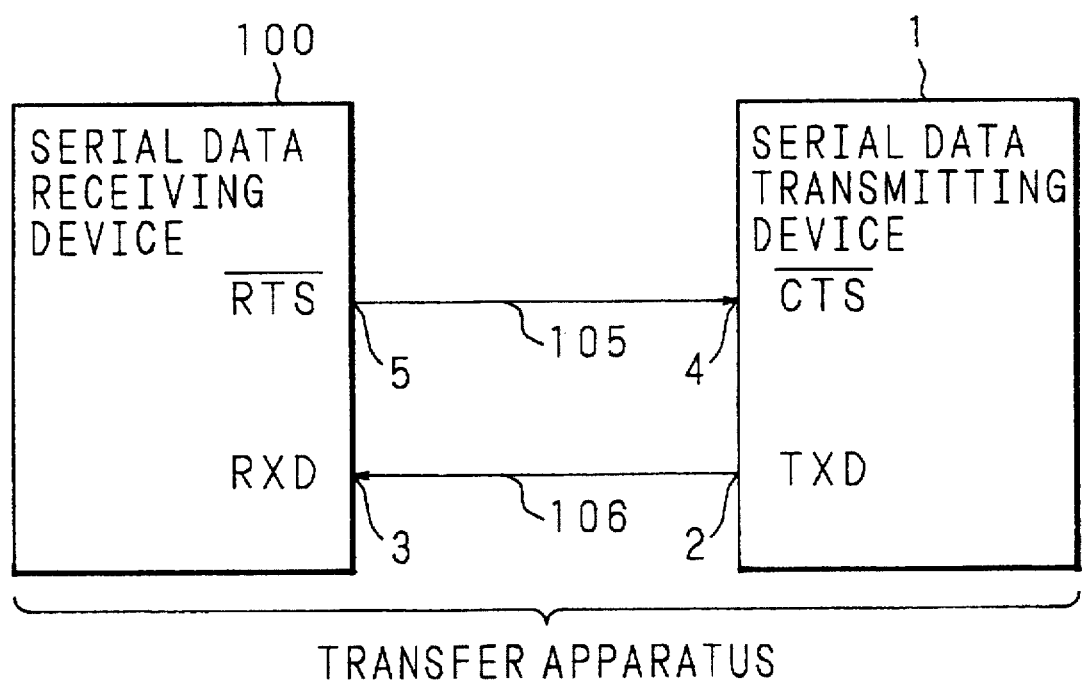
FIG. 4 is a block diagram showing the connection between a serial data receiving device according to EMBODIMENT 1 and a serial data transmitting device.

FIG. 4 is a block diagram showing the connection between a serial data receiving device according to EMBODIMENT 1 and a serial data transmitting device. A serial data receiving device 100 sends a hand-shake signal 105 via an RTS output terminal 5, when a serial data transmitting device 1 receiving the hand-shake signal 105 at a CTS input terminal 4 sends a transfer data 106 via a TXD output terminal 2. The serial data receiving device 100 receives the transfer data 106 at an RXD input terminal 3.

Figure 5:
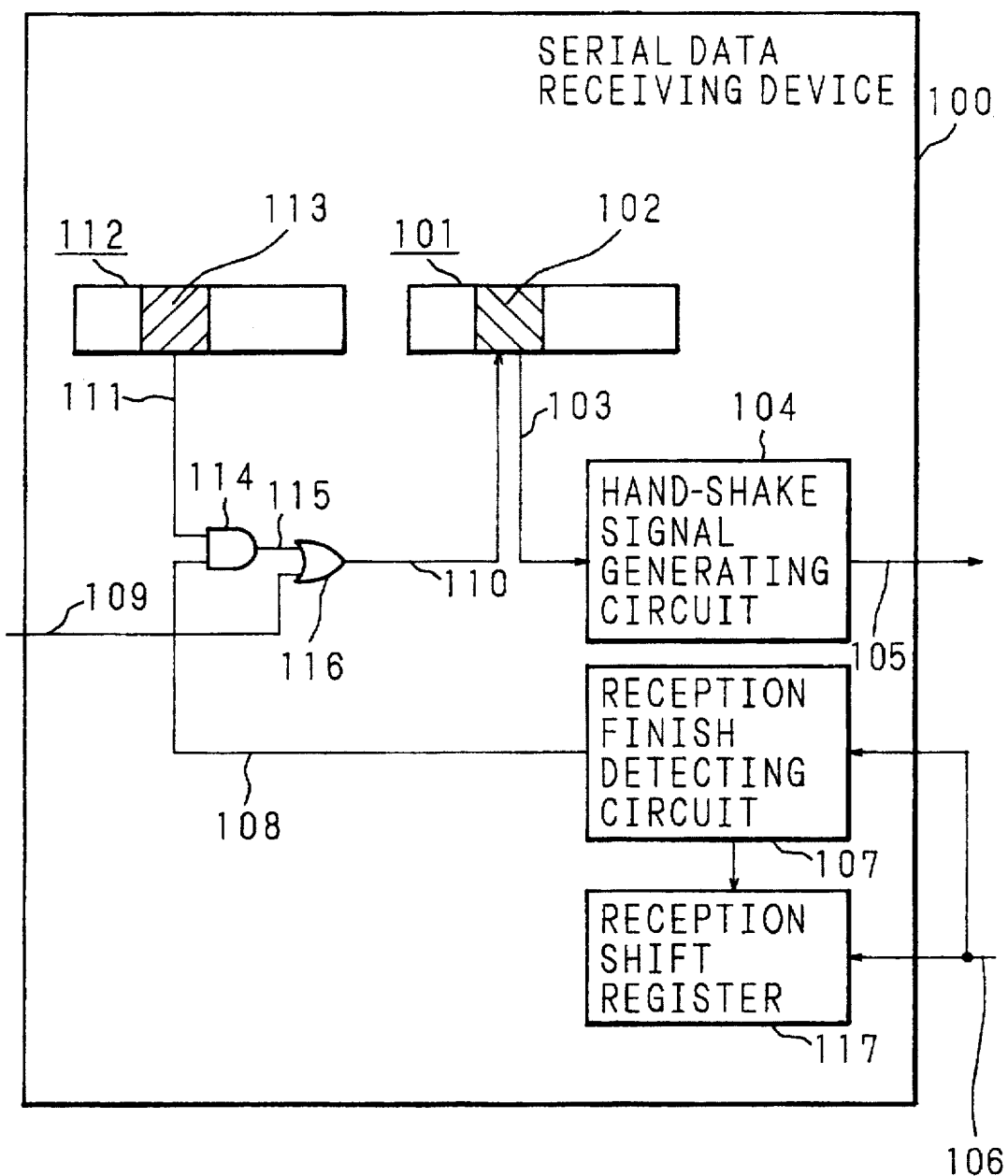
FIG. 5 is a block diagram schematically showing the structure of the serial data receiving device of EMBODIMENT 1.

FIG. 5 is a block diagram schematically showing the structure of the serial data receiving device 100. The serial data receiving device 100 includes a mode register 112 for setting a data transfer mode which has a single mode bit 113 for setting an operation of forcible suspending of transfer and connected to one input terminal of a logical product circuit (hereinafter referred to as "AND circuit") 114. The data transfer method includes the method employing in EMBODIMENT 1 wherein a hand-shake signal is suspended every time the transfer of serial data in a single bit or in a predetermined number of bits is finished, and the method according to a conventional data transfer method, etc.

A reception finish signal 108 is supplied to the other input terminal of the AND circuit 114 whose output terminal is connected to one input terminal of a logical OR circuit (hereinafter referred to as "OR circuit") 116. To the other input terminal of the OR circuit 116 is sent from outside an SIO reset signal 109 for resetting the serial data receiving device 100. An output terminal of the OR circuit 116 is connected to a reception permit bit 102 of a control register 101 (a second memory means) for setting bits relating to the control of the serial data receiving device 100. The bit 102 relates to the reception permission state for the serial data receiving device.

An output of the reception permit bit 102 is sent to a hand-shake signal generating circuit 104 which is a first signal generating means, as a reception permit signal. The hand-shake signal generating circuit 104 generates a hand-shake signal 105 which represents a request to send and a permission to send data for the transmitting device 1.

The transfer data 106 from the serial data transmitting device 1 is inputted to a reception shift register 117 which is a first memory, and also to a reception finish detecting circuit 107 as a first detecting means. The reception finish signal 108 from the reception finish detecting circuit 107 is sent to the other input terminal of the AND circuit 114.

The operation of the serial data receiving device 100 of EMBODIMENT 1 will be described by referring to timing charts of FIGS. 6A to 6F:

When the SIO reset signal 109 is inputted to the OR circuit 116 from the outside, and immediately after the circuit 116 is initialized, the control register 101 and mode register 112 are initialized. Accordingly, the reception permit bit 102 of the control register 101 and the single mode bit 113 of the mode register 112 are reset to "0".

Figure 6:
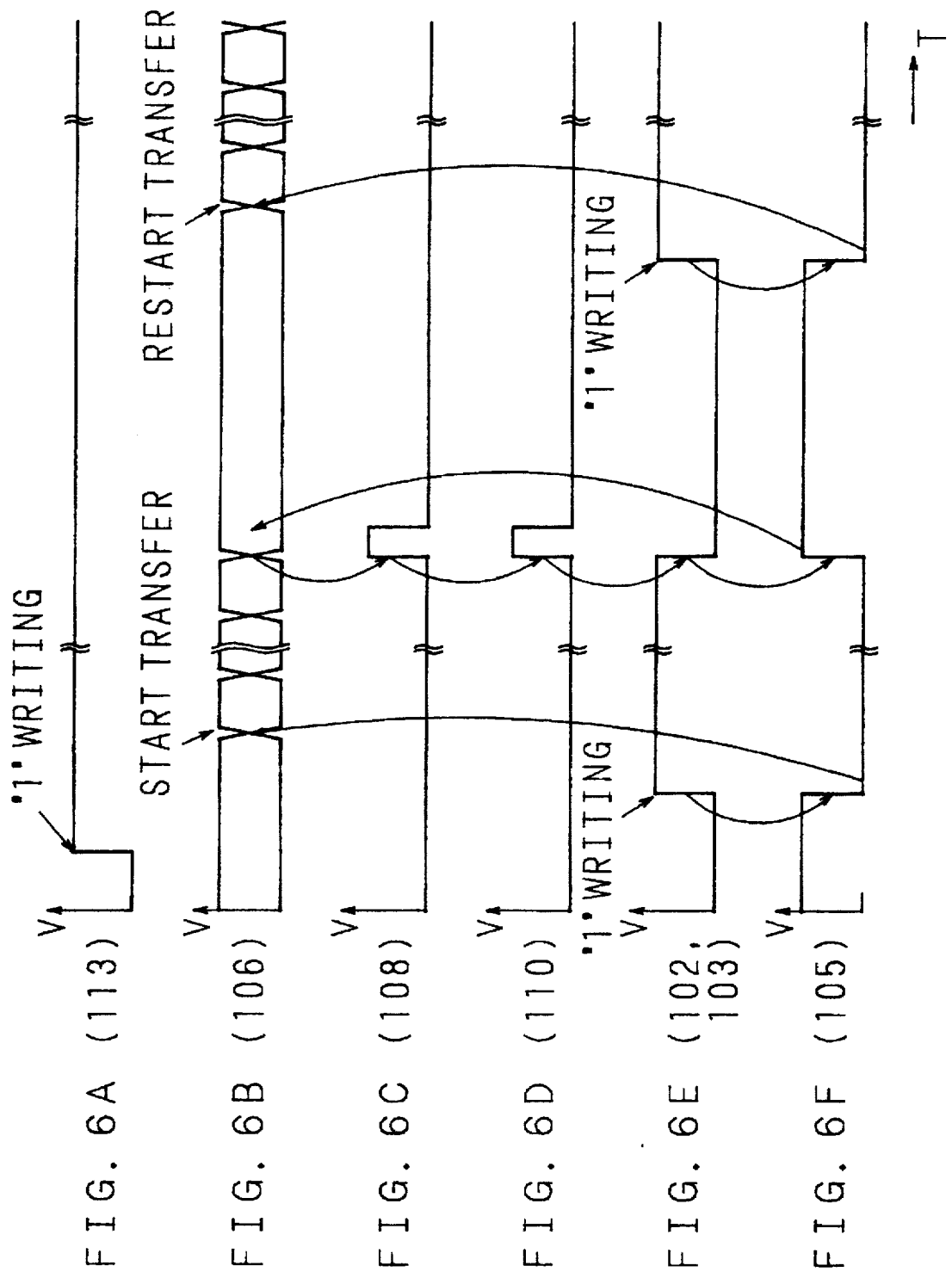
FIG. 6A is a timing chart of data in a single mode bit in EMBODIMENT 1.
FIG. 6B is a timing chart of transfer data in EMBODIMENT 1.
FIG. 6C is a timing chart of a reception finish signal in EMBODIMENT 1.
FIG. 6D is a timing chart of a reception permit reset signal in EMBODIMENT 1.
FIG. 6E is a timing chart of data in a reception permit bit in EMBODIMENT 1.
FIG. 6F is a timing chart of a hand-shake signal in EMBODIMENT 1.

When the operation of forcible suspending of transfer in this EMBODIMENT is to be exerted by the receiving device, the single mode bit 113 of the mode register 112 is set to "1" by a program, a dipswitch, or the like (FIG. 6A). When the single mode bit 113 is set to "0", the receiving operation proceeds in the known manner.

When the reception permit bit 102 of the control register 101 is set to "1" (FIG. 6E), the serial data receiving device 100 is turned ready to receive data, and the reception permit signal 103 of "1" is outputted to the hand-shake signal generating circuit 104 from the reception permit bit 102. In receiving the reception permit signal 103, the hand-shake signal generating circuit 104 outputs the hand-shake signal 105 (FIG. 6F) in valid via the RTS output terminal 5 to the CTS input terminal 4 of the serial data transmitting device 1.

When the serial data transmitting device 1 receives the hand-shake signal 105, it transmits the serial transfer data 106 (FIG. 6B) bit by bit to the RXD input terminal 3 of the serial data receiving device 100 via the TXD output terminal 2. In the serial data receiving device 100 the reception shift register 117 shifts the transmitted transfer data 106 bit by bit, and then stores the data. The reception finish detector circuit 107 counts the transfer data 106 bit by bit by the number of bits in one serial data. When the counting is finished, the circuit 107 determines that the reception of the last bit in the transfer data 106 is finished, with outputting the reception finish signal 108 (FIG. 6C) to the AND circuit 114.

Since the single mode bit 113 (FIG. 6A) of the mode register 112 is set to "1", the AND circuit 114 outputs a single mode reset signal 115 when the reception finish signal 108 is inputted thereto. When the OR circuit 116 receives the single mode reset signal 115, it outputs the reception permit reset signal 110 (FIG. 6D) to the reception permit bit 102 of the control register 101. When the reception permit bit 102 receives the reception permit reset signal 110, the bit 102 is reset to "0". Accordingly, the reception permit signal 103 (FIG. 6E) becomes invalid.

In the hand-shake signal generating circuit 104 the hand-shake signal 105 (FIG. 6F) is invalidated in response to the invalidation of the reception permit signal 103, thereby to request the serial data transmitting device 1 to suspend the data transfer.

The serial data transmitting device 1 stops transferring the transfer data in response to the notification that the hand-shake signal 105 is invalidated.

In compliance with the reception finish signal 108, in the serial data receiving device 100 a CPU or other external device reads out the transfer data 106 stored in the reception shift register 117 as parallel data.

In a case where the handling of the transfer data 106 is finished by the CPU or other device, in a case where the transfer of data is to be resumed, "1" is set to the reception permit bit 102 of the control register 101 so as to change the reception permit signal 103 (FIG. 6E) to become valid. As a result, the hand-shake signal 105 (FIG. 6F) from the hand-shake signal generating circuit 104 becomes valid. The serial data transmitting device 1 sends the transfer data 106 afterwards to the serial data receiving device 100 through the TXD output terminal 2 in response to each hand-shake signal 105 in the same manner as above.

As described above, in this example the serial data receiving device 100 detects the completion of receiving of the transfer data and invalidates the hand-shake signal, thereby controlling the suspension of the data transfer.

It is also possible to so constitute as to invalidate the hand-shake signal by inputting the reception finish signal 108 directly to the hand-shake signal generating circuit 104.

EMBODIMENT 2

Figure 7:
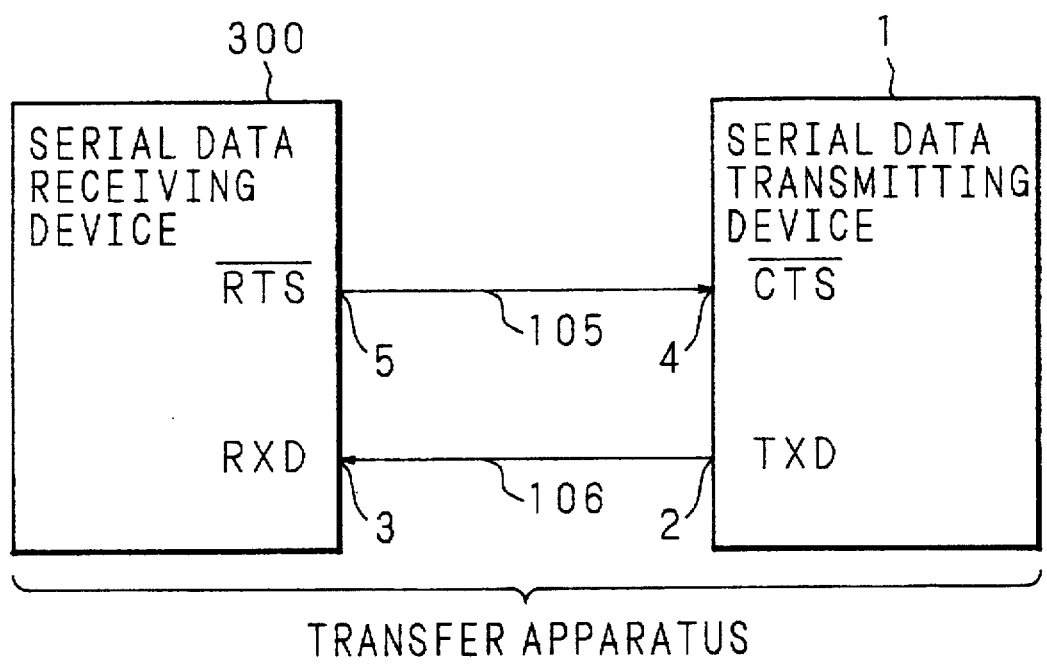
FIG. 7 is a block diagram showing the connection between a serial data receiving device according to EMBODIMENT 2 and a serial data transmitting device.

FIG. 7 is a block diagram showing the connection between a serial data receiving device according to EMBODIMENT 2 and a serial data transmitting device. The hand-shake signal 105 is outputted from the RTS output terminal 5 of a serial data receiving device 300, and the serial data transmitting device 1 receives the hand-shake signal 105 at the CTS input terminal 4 and outputs the transfer data 106 out from the TXD output terminal 2. The serial data receiving device 300 receives the transfer data 106 at the RXD input terminal 3.

Figure 8:
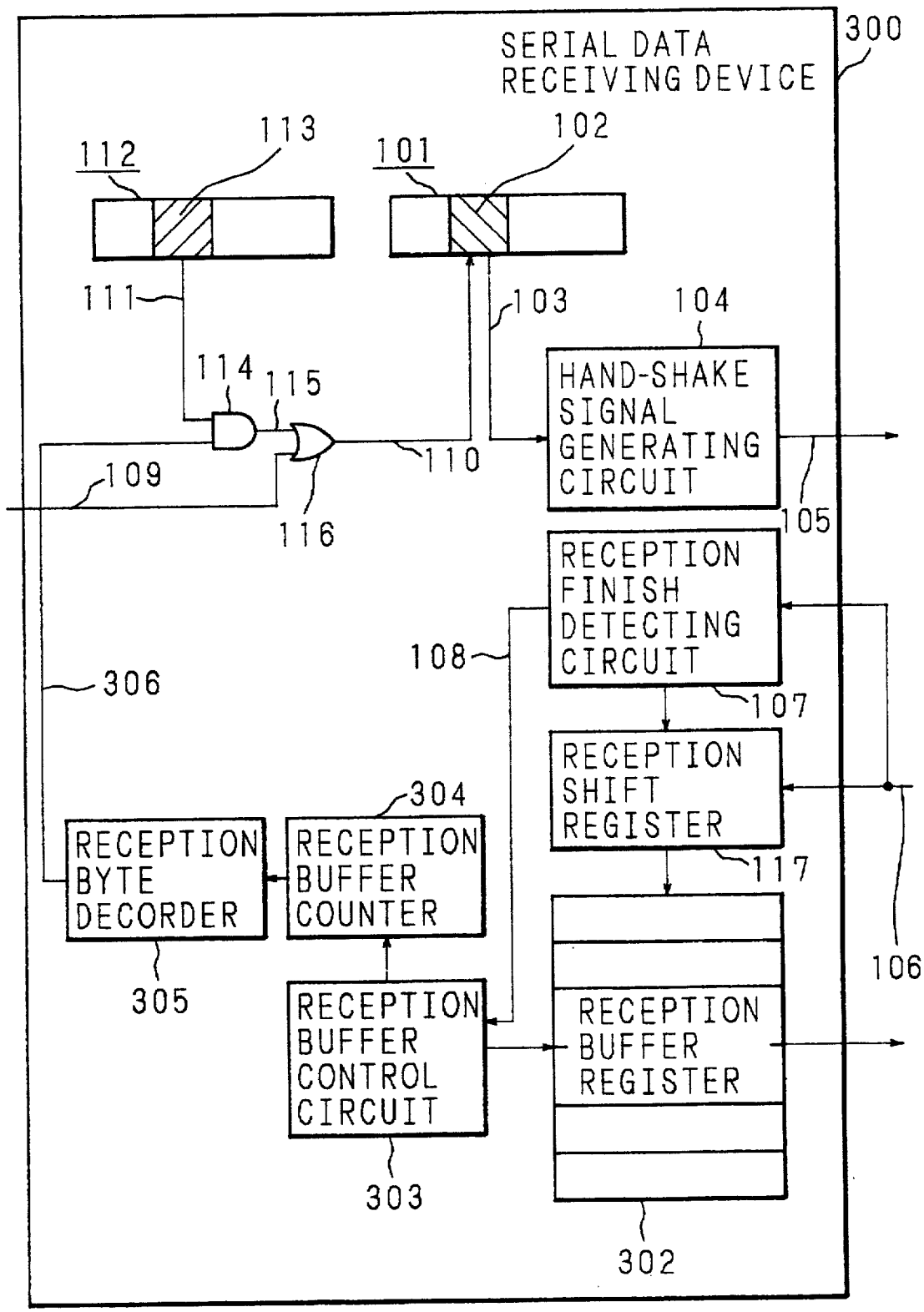
FIG. 8 is a block diagram schematically showing the structure of the serial data receiving device of EMBODIMENT 2.

FIG. 8 is a block diagram schematically showing the structure of the serial data receiving device 300. In addition to the components of EMBODIMENT 1, the serial data receiving device 300 is provided with a reception buffer register 302 (a third memory means) for receiving and storing a predetermined number of transfer data 106 from the reception shift register 117, a reception buffer control circuit 303 (a second control means) for controlling the read/write to the reception buffer register 302, a reception buffer counter 304 for counting the transfer data 106 stored in the reception buffer register 302, and an reception byte decoder 305 for decoding a predetermined value counted by the reception buffer counter 304. The reception finish signal 108 from the reception finish detector circuit 107 is inputted to the reception buffer control circuit 303. The reception byte decoder 305 sends a reception byte decode output 306 which represents that the reception buffer register 302 stores a predetermined number of bytes to the other input terminal of the AND circuit 114. Since the other components of this example are in the same structure as those of the serial data receiving device 100 of EMBODIMENT 1, they are designated by the same reference numerals, and the description of them will be omitted.

The operation of the serial data receiving device 300 will be described by referring to timing charts in FIGS. 9A to 9H.

Figure 9:
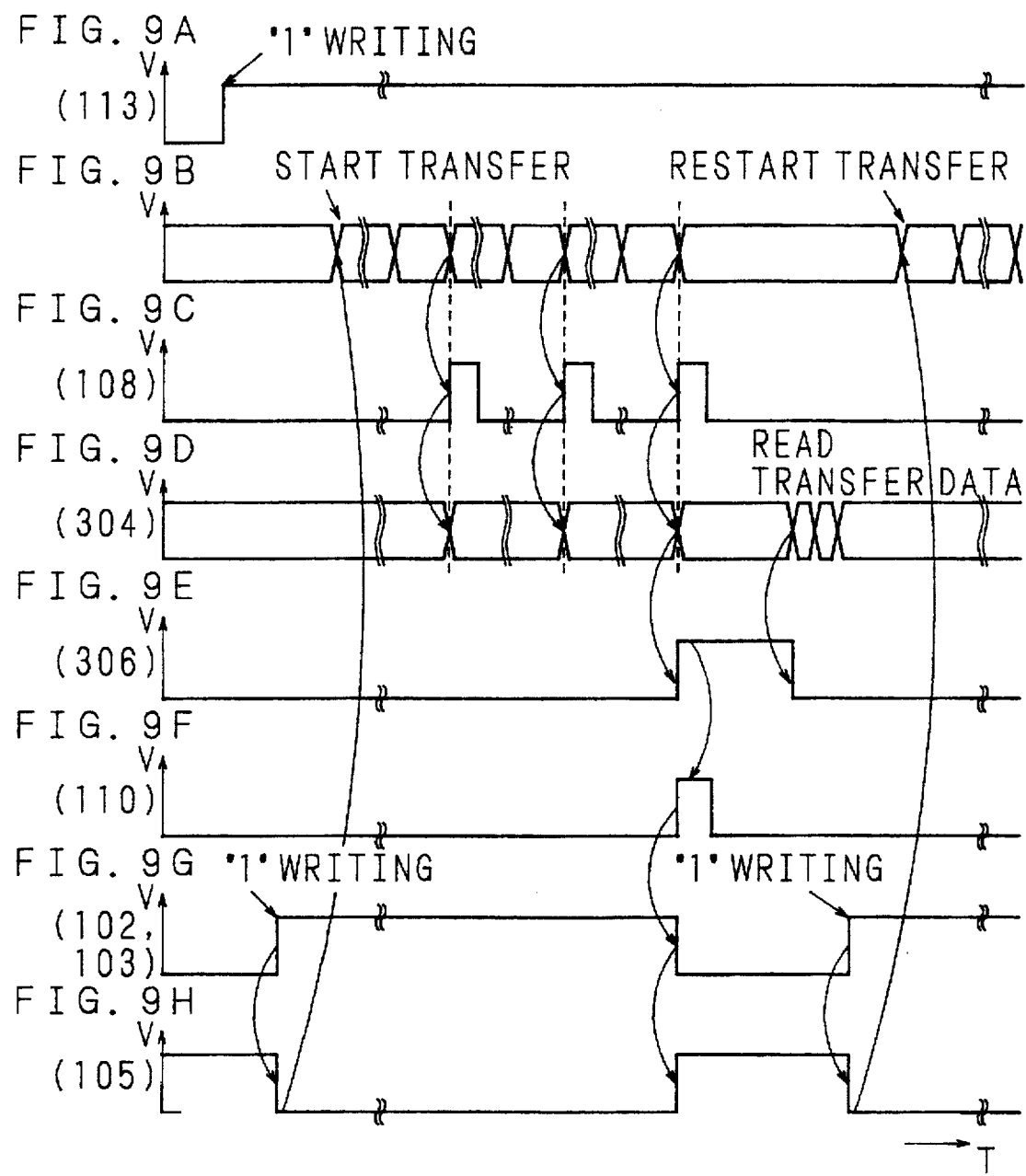
FIG. 9A is a timing chart of data in a single mode bit in EMBODIMENT 2.
FIG. 9B is a timing chart of transfer data in EMBODIMENT 2.
FIG. 9C is a timing chart of a reception finish signal in EMBODIMENT 2.
FIG. 9D is a timing chart showing the number of bytes counted by a reception buffer counter in EMBODIMENT 2.
FIG. 9E is a timing chart of a received byte decode output in EMBODIMENT 2.
FIG. 9F is a timing chart of a reception permit reset signal in EMBODIMENT 2.
FIG. 9G is a timing chart of a reception permit signal in EMBODIMENT 2.
FIG. 9H is a timing chart of a hand-shake signal in EMBODIMENT 2.

The reception shift register 117 shifts the serial transfer data 106 (FIG. 9B) bit by bit before storing the same. The reception finish detector circuit 107 counts the transfer data 106 bit by bit by the number of bits in one serial data (8 bits in EMBODIMENT 2), and when completing the counting, the detector circuit 107 detects that the reception of the last bit of the transfer data 106 is finished, thereby outputting the reception finish signal 108 (FIG. 9C).

The reception buffer register 302 receives the transfer data 106 converted to parallel data from the reception shift register 117 and stores it under the control of the reception buffer control circuit 303 which receives the reception finish signal 108. The reception buffer control circuit 303 also controls the reading of the transfer data 106 from the reception buffer register 302 by a CPU or other external device. The reception buffer counter 304 counts the number of bytes in the transfer data 106 stored in the reception buffer register 302 (FIG. 9D).

The reception byte decoder 305 decodes a predetermined count value (for example, 3) obtained by the reception buffer counter 304, and outputs the value as the reception byte decode output signal 306 (FIG. 9E) to the AND circuit 114. At this stage, the single mode bit 113 (FIG. 9A) of the mode register 112 is set to "1", and therefore, the AND circuit 114 outputs the single mode reset signal 115. The OR circuit 116, in response to the single mode reset signal 115 and the SIO reset signal 109, outputs the reception permit reset signal 110 (FIG. 9F) valid to the reception permit bit 102 of the control register 101. The reception permit bit 102 is reset to "0" in response to the reception permit reset signal 110, and as a result, the reception permit signal 103 (FIG. 9G) becomes invalid.

Since the reception permit signal 103 is invalidated, the hand-shake signal generating circuit 104 invalidates the hand-shake signal 105 (FIG. 9H), and informs the serial data transmitting device 1 to suspend the data transfer.

The serial data transmitting device 1 stops transferring of the transfer data subsequent to the invalidation of the hand-shake signal 105.

In the serial data receiving device 300 the reception buffer control circuit 303 controls the CPU or other external device to read the transfer data 106 from the reception buffer register 302 in response to the reception finish signal 108. In this case, the number of bytes counted by the reception buffer counter 304 changes from 3→2→1 to 0 in accordance with the reception buffer control circuit 303. When the reception byte decoder 305 outputs the input byte decode output 306 in invalid when the reception buffer counter 304 counts a predetermined number of bytes.

When the reception byte decode output 306 becomes invalid, the AND circuit 114 consequently outputs the single mode reset signal 115 which is invalid. At this time, since the SIO reset signal 109 is negated, the reception permit reset signal 110 of the OR circuit 116 remains invalid (FIG. 9F). After the reception permit bit 102 of the control register 101 is reset by the reception permit reset signal 110, the reception permit bit 102 does not output the reception permit signal 103 unless it is again set to "1". The hand-shake signal generating circuit 104 does not change the hand-shake signal 105 to valid the signal unless the reception permit signal 103 is outputted.

In a case where the transfer of data is to be resumed after the handling of the transfer data by the CPU or other external device is finished, "1" is set to the reception permit bit 102 of the control register 101. As a result the reception permit signal 103 (FIG. 9G) becomes valid, and the hand-shake signal 105 (FIG. 9H) from the hand-shake signal generating circuit 104 becomes valid. The procedure afterwards follows in the same manner as mentioned above. That is, the serial data transmitting device 1 sends the transfer data 106 to the serial data receiving device 300 via the TXD output terminal 2 every time the device 1 receives the hand-shake signal 105. The operation in other points is the same as that of the serial data receiving device 100 of EMBODIMENT 1.

As described above, each time a predetermined number of bytes in the transfer data 106 received is detected, the hand-shake signal is invalidated. In this way the serial data receiving device 300 is able to control the suspension of the data transfer.

EMBODIMENT 3

Figure 10:
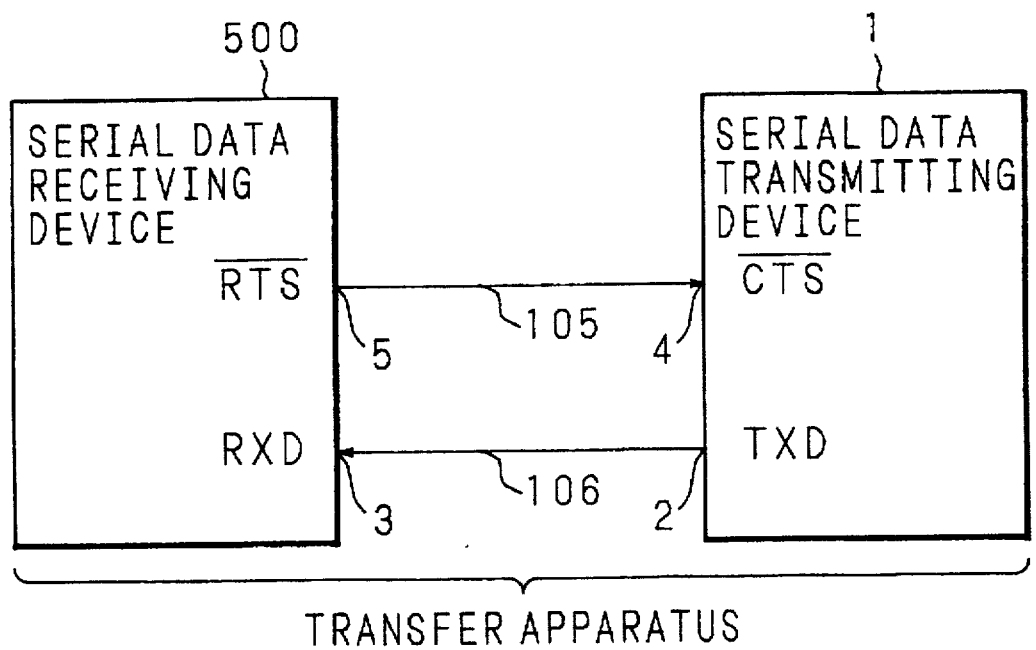
FIG. 10 is a block diagram showing the connection between a serial data receiving device according to EMBODIMENT 3 and a serial data transmitting device.

FIG. 10 is a block diagram showing the connection between a serial data receiving device according to EMBODIMENT 3 and a serial data transmitting device. The hand-shake signal 105 is sent via the RTS output terminal 5 of a serial data receiving device 500, and the serial data transmitting device 1 receives the hand-shake signal 105 at the CTS input terminal 4 and then sends the transfer data 106 via the TXD output terminal 2. The serial data receiving device 500 receives the transmitted transfer data 106 at the RXD input terminal 3.

Figure 11:
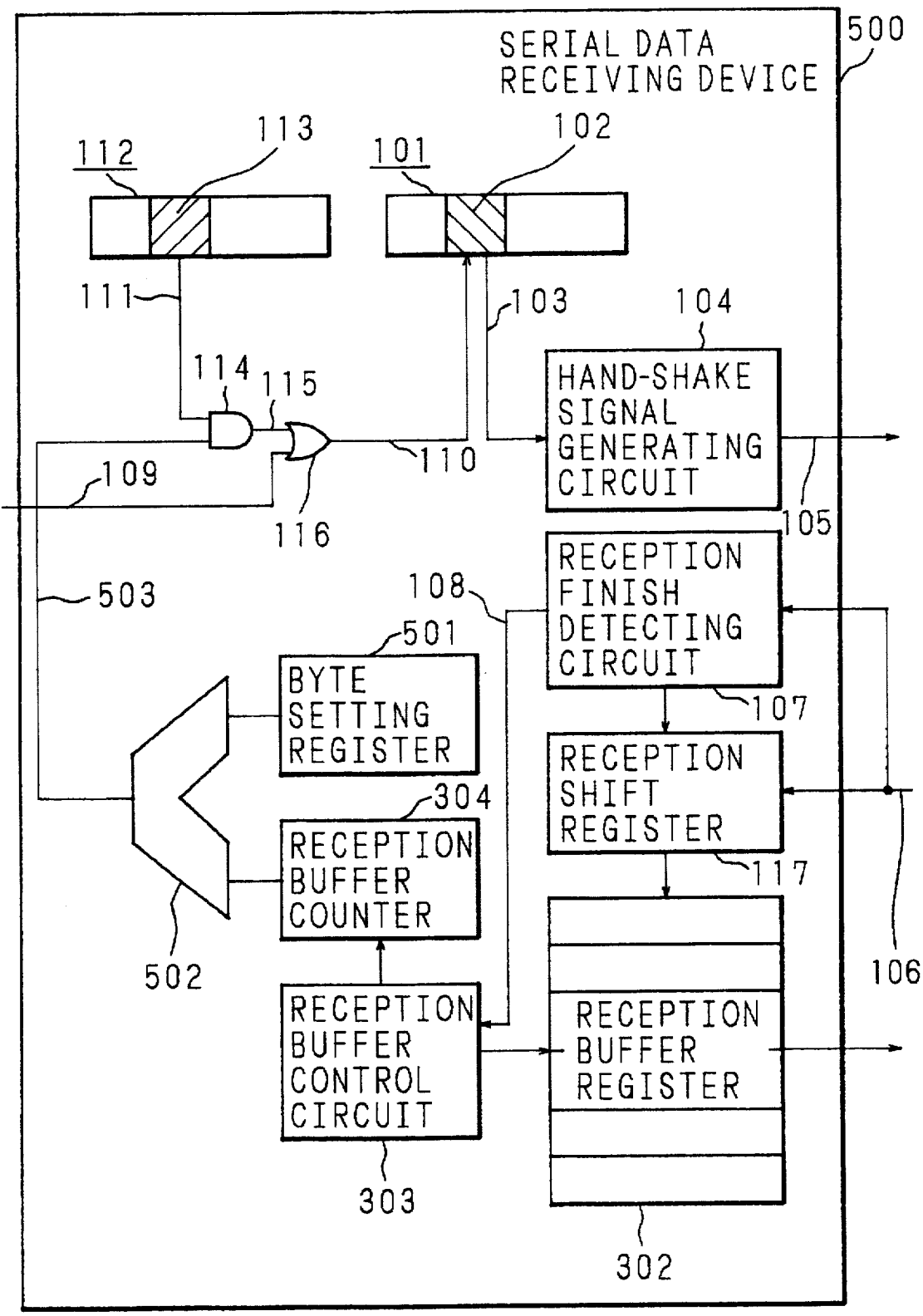
FIG. 11 is a block diagram schematically showing the structure of the serial data receiving device of EMBODIMENT 3.

FIG. 11 is a block diagram schematically showing the structure of the serial data receiving device 500. In addition to the components of EMBODIMENT 1, the serial data receiving device 500 is provided with the reception buffer register 302 for receiving and storing a predetermined number of transfer data 106 from the reception shift register 117, the reception buffer control circuit 303 for controlling the read/write to the reception buffer register 302, the reception buffer counter 304 for counting the transfer data 106 stored in the reception buffer register 302, a byte setting register 501 (a fourth memory means) for setting a predetermined number of bytes, and a comparator 502 for comparing the number of bytes counted by the reception buffer counter 304 and a value set by the byte setting register 501. The reception finish signal 108 from the reception finish detector circuit 107 is inputted to the reception buffer control circuit 303. A matched signal 503 which represents that the number counted by the reception buffer counter 304 agrees with the value set by the byte setting register 501 is inputted to the other input terminal of the AND circuit 114 from the comparator 502. The structure in other points of the serial data receiving device of EMBODIMENT 3 is the same as that of the serial data receiving device 100 discussed in EMBODIMENT 1.

The operation of the serial data receiving device 500 will be described by referring to timing charts in FIGS. 12A to 12I.

The reception shift register 117 shifts the serial transfer data 106 (FIG. 12B) bit by bit and stores the data. The reception finish detector circuit 107 counts the transfer data 106 bit by bit by the number of bits in one serial data (8 bits in EMBODIMENT 3). When the counting is finished, the detector circuit 107 determines that the reception of the last bit of the transfer data 106 is finished, thereby outputting the reception finish signal 108 (FIG. 12C).

The reception buffer register 302 receives the transfer data 106 converted to parallel data from the reception shift register 117 and stores it under the control of the reception buffer control circuit 303 receiving the reception finish signal 108. The reception buffer control circuit 303 also controls a CPU or other external device to read of the transfer data 106 from the reception buffer register 302. The reception buffer counter 304 counts the number of bytes of the transfer data 106 stored in the reception buffer register 302 (FIG. 12D).

Figure 12:
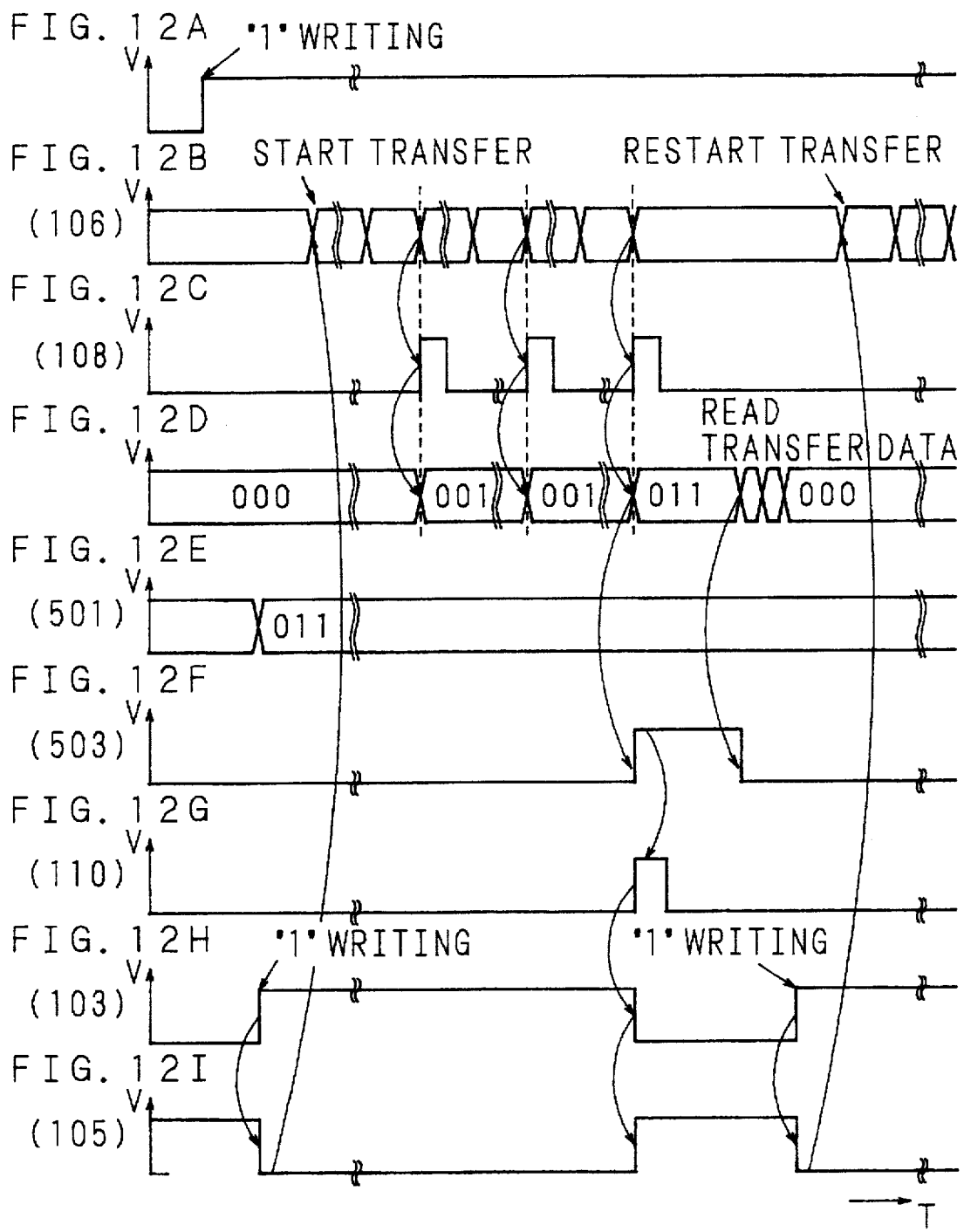
FIG. 12A is a timing chart of data in a single mode bit in EMBODIMENT 3.
FIG. 12B is a timing chart of transfer data in EMBODIMENT 3.
FIG. 12C is a timing chart of a reception finish signal in EMBODIMENT 3.
FIG. 12D is a timing chart showing the number of bytes counted by a reception buffer counter in EMBODIMENT 3.
FIG. 12E is a timing chart showing the number of bytes set in a byte setting register in EMBODIMENT 3.
FIG. 12F is a timing chart of a matched signal in EMBODIMENT 2.
FIG. 12G is a timing chart of a reception permit reset signal in EMBODIMENT 3.
FIG. 12H is a timing chart of a reception permit signal in EMBODIMENT 3.
FIG. 12I is a timing chart of a hand-shake signal in EMBODIMENT 3.

The byte setting register 501 has a predetermined number of bytes (for example, 3) set therein beforehand (FIG. 12E). The comparator 502 compares the predetermined number of bytes with the value counted by the reception buffer counter 304 at all times. When they agree, the matched signal 503 (FIG. 12F) is sent to the AND circuit 114. At this stage, the single mode bit 113 (FIG. 12A) of the mode register 112 is set to "1", and therefore, the AND circuit 114 outputs the single mode reset signal 115.

The OR circuit 116, in response to the single mode reset signal 115, sends the reception permit reset signal 110 (FIG. 12G) to the reception permit bit 102 of the control register 101. The reception permit bit 102 is reset to "0" when the permit reset signal 110 is inputted thereto, and as a result, the reception permit signal 103 (FIG. 12H) is turned to invalid.

When the reception permit signal 103 is invalidated, the hand-shake signal generating circuit 104 invalidates the hand-shake signal 105 (FIG. 12I), and informs the serial data transmitting device 1 to stop that the data transfer.

In response to the invalidation of the hand-shake signal 105, the serial data transmitting device 1 stops transferring the transfer data.

In the serial data receiving device 500 the reception buffer control circuit 303, upon receipt of the reception finish signal 108, controls the CPU or other external device to read the transfer data 106 from the reception buffer register 302.

In this case, the number of bytes (FIG. 12D) counted by the reception buffer counter 304 changes from 3→2→1 to 0 through the reception buffer control circuit 303. The comparator 502 changes the matched signal 503 (FIG. 12F) to invalid in accordance with the number of bytes counted by the reception buffer counter 304.

Since the matched signal 503 becomes invalid, the AND circuit 114 outputs the single mode reset signal 115 which is invalid. At this time, since the SIO reset signal 109 is negated the reception permit reset signal 110 (FIG. 12G) of the OR circuit 116 remains invalid. After the reception permit bit 102 of the control register 101 is reset by the reception permit reset signal 110, the reception permit bit 102 does not output the reception permit signal 103 so long as the bit 102 is not again set to "1". The hand-shake signal generating circuit 104 never returns the hand-shake signal 105 to valid unless the reception permit signal 103 is outputted.

In a case where the transfer of data is to be resumed after the CPU or other external device finishes processing of the transfer data, "1" is set to the reception permit bit 102 of the control register 101. As a result the reception permit signal 103 (FIG. 12H) becomes valid, and the hand-shake signal 105 (FIG. 12I) from the hand-shake signal generating circuit 104 becomes valid. The following procedure proceeds similar to the aforementioned operation. The serial data transmitting device 1 sends the transfer data 106 to the serial data receiving device 500 from the TXD output terminal 2 whenever receiving the hand-shake signal 105. The operation in other points is the same as that of the serial data receiving device 100 of EMBODIMENT 1.

As described above, each time a predetermined number of bytes in the transfer data 106 is detected, the hand-shake signal is invalidated. In this way the serial data receiving device 500 can control the suspension of transferring of the data.

EMBODIMENT 4

Figure 13:
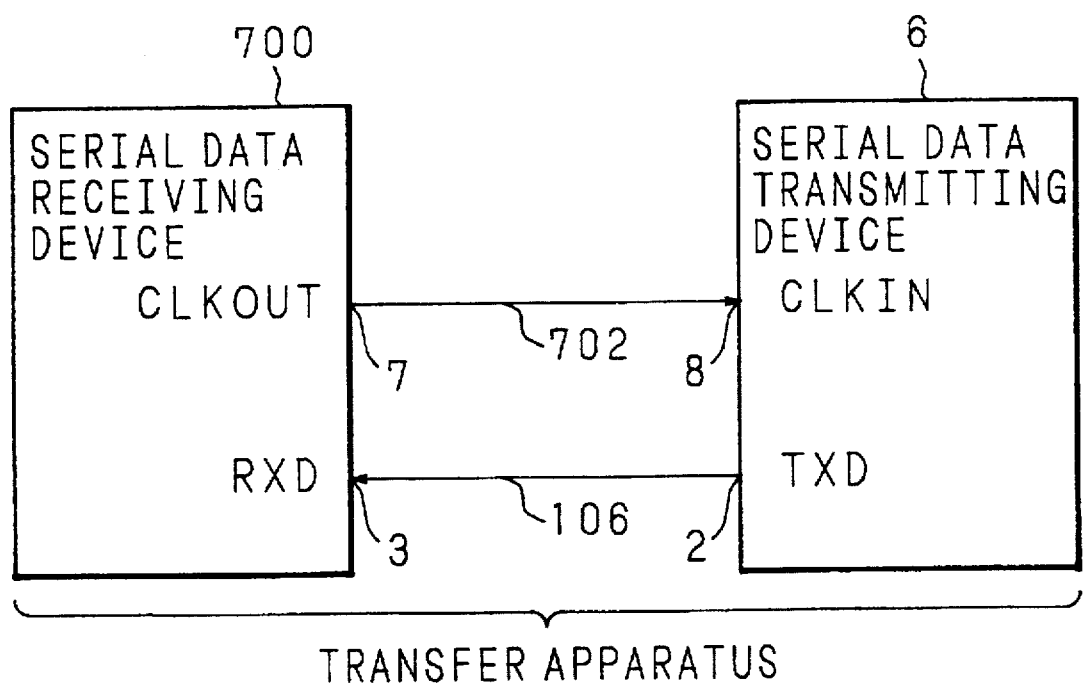
FIG. 13 is a block diagram showing the connection between a serial data receiving device according to EMBODIMENT 4 and a serial data transmitting device.

FIG. 13 is a block diagram showing the connection between a serial data receiving device of EMBODIMENT 4 and a serial data transmitting device. A serial data receiving device 700 outputs a transfer clock 702 via a CLKOUT output terminal 7 thereof. A serial data transmitting device 6 receives the transfer clock 702 at a CLKIN input terminal 8, and sends the transfer data 106 from the TXD output terminal 2 in synchronism with the transfer clock 702. The serial data receiving device 700 receives the transfer data 106 at the RXD input terminal 3.

Figure 14:
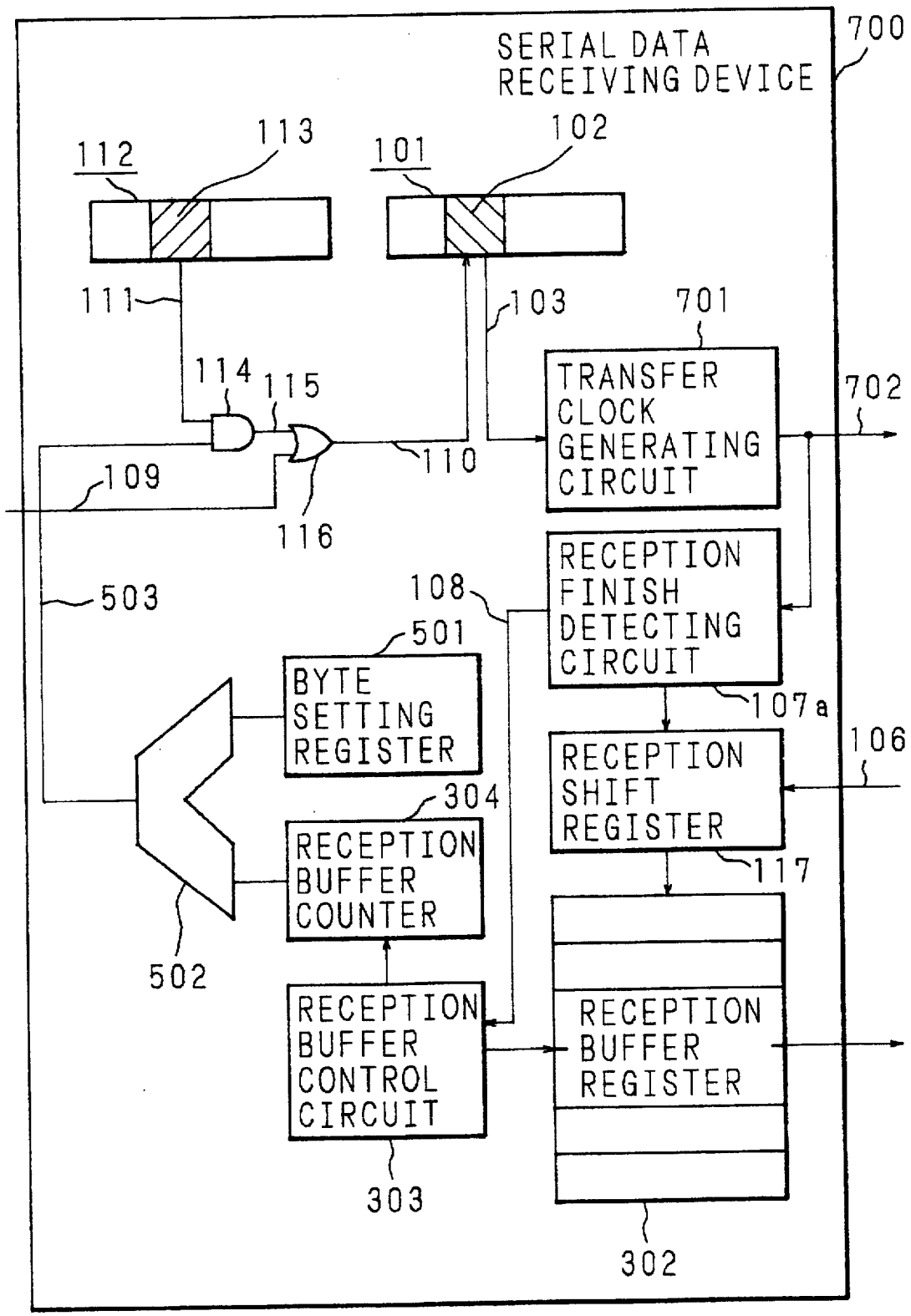
FIG. 14 is a block diagram schematically showing the structure of the serial data receiving device according to EMBODIMENT 4.

FIG. 14 is a schematic block diagram showing the structure of the serial data receiving device 700. In addition to the components of EMBODIMENT 1, the serial data receiving device 700 is provided with the reception buffer register 302 for receiving and storing a predetermined number of transfer data 106 from the reception shift register 117, the reception buffer control circuit 303 for controlling the read/write to the reception buffer register 302, and the reception buffer counter 304 for counting the transfer data 106 stored in the reception buffer register 302. In addition, the serial data receiving device 700 is provided with the byte setting register 501 for setting a predetermined number of bytes, and the comparator 502 for comparing the number of bytes counted by the reception buffer counter 304 and a value set by the byte setting register 501. The reception finish signal 108 from a reception finish detector circuit 107a is sent to the reception buffer control circuit 303. The matched signal 503 which represents that the number counted by the reception buffer counter 304 and the value set by the byte setting register 501 agree, is sent to the other input terminal of the AND circuit 114 by the comparator 502.

The reception permit signal 103 from the reception permit bit 102 of the control register 101 is sent to a transfer clock generating circuit (a second signal generating means) 701 which generates the transfer clock 702 used to transfer the data. The transfer clock 702 generated in the transfer clock generating circuit 701 is sent to the serial data transmitting device 6 and the reception finish detector circuit 107a. The other points of structure are the same as in the serial data receiving device 100 of EMBODIMENT 1.

The operation of the serial data receiving device 700 will be described by referring to timing charts of FIGS. 15A to 15I.

When the reception permit bit 102 of the control register 101 is set to "1", the serial data receiving device 700 is ready to receive transfer data, and the reception permit bit 102 outputs the reception permit signal 103 (FIG. 15H) of "1" to the transfer clock generating circuit 701. In response to the reception permit signal 103, the transfer clock generating circuit 701 generates the transfer clock 702 (FIG. 15I) for the transfer of data, and sends to the CLKIN input terminal 8 of the serial data transmitting device 6 via the CLKOUT output terminal 7.

In receiving the transfer clock 702, the serial data transmitting device 6, in synchronism with the transfer clock 702, sends the serial transfer data 106 (FIG. 15B) bit by bit to the RXD input terminal 3 of the serial data receiving device 700 via the TXD output terminal 2.

In the serial data receiving device 700 the reception shift register 117 shifts the transferred data 106 bit by bit, and stores the data. The reception finish detector circuit 107a counts the transfer clock 702 clock by clock by the number of bits in one serial data (8 bits in EMBODIMENT 4). When the counting is finished, the detector circuit 107a determines that the reception of the last bit of the transfer data 106 is finished, thereby outputting the reception finish signal 108 (FIG. 15C).

The reception buffer register 302 receives the transfer data 106 converted to parallel data from the reception shift register 117 and stores it under the control of the reception buffer control circuit 303 which receives the reception finish signal 108. The reception buffer control circuit 303 also controls the reading of the transfer data 106 from the reception buffer register 302 by a CPU or other external device. The reception buffer counter 304 counts the number of bytes in the transfer data 106 stored in the reception buffer register 302 (FIG. 15D).

The byte setting register 501 stores a predetermined number of bytes (for example, 3) (FIG. 15E) beforehand. The comparator 502 compares the predetermined number of bytes with the value counted by the reception buffer counter 304 at all times, and when they agree, a matched signal 503 (FIG. 15F) is sent to the AND circuit 114 from the comparator 502. At this stage, the single mode bit 113 (FIG. 15A) of the mode register 112 is set to "1", and therefore, the AND circuit 114 outputs the single mode reset signal 115.

The OR circuit 116, in response to the single mode reset signal 115, sends the reception permit reset signal 110 (FIG. 15G) to the reception permit bit 102 of the control register 101. The reception permit bit 102 is reset to "0" when the reception permit reset signal 110 is inputted thereto, and as a result, the reception permit signal 103 (FIG. 15H) becomes invalid.

When the reception permit signal 103 is invalidated, the transfer clock generating circuit 701 stops generating the transfer clock 702 (FIG. 15I), and requests the serial data transmitting device 6 to stop the transfer of data.

In response to the suspension of the generation of the transfer clock 702, the serial data transmitting device 6 stops transferring the transfer data.

In the serial data receiving device 700 the reception buffer control circuit 303 controls the CPU or other external device to read the transfer data 106 from the reception buffer register 302 in response to the reception finish signal 108. In this case, the number of bytes (FIG. 15D) counted by the reception buffer counter 304 changes from 3→2→1 to 0 according to the input control circuit 303. The comparator 502 turns the matched signal 503 (FIG. 15F) to invalid in accordance with the number of bytes counted by the reception buffer counter 304.

When the matched signal 503 becomes invalid, the AND circuit 114 invalidates the single mode reset signal 116, and the OR circuit 116 invalidates the reception permit reset signal 110 (FIG. 15G). After the reception permit bit 102 of the control register 101 is reset by the reception permit reset signal 110, the reception permit bit 102 does not output the reception permit signal 103 unless the bit 102 is again set to "1". The transfer clock generating circuit 701 does not generate the transfer clock 702 either unless the reception permit signal 103 is sent thereto.

In a case where the transfer of data is to be resumed after the CPU or other external device finishes processing of the transfer data, "1" is set to the reception permit bit 102 of the control register 101. As a result the reception permit signal 103 (FIG. 15H) becomes valid, and the transfer clock 702 (FIG. 15I) is generated by the transfer clock generating circuit 701, and is sent to the serial data transmitting device 6. The procedure follows in the same manner as above. The serial data transmitting device 6 sends the transfer data 106 to the serial data receiving device 700 in synchronism with the transfer clock 702. The other points of the operation are the same as in the serial data receiving device 100 described in EMBODIMENT 1.

As described above, each time a predetermined number of bytes in the transfer data 106 is detected, the generation of the transfer clock 702 is suspended. In this way the serial data receiving device 700 can control the suspension of transferring of the data.

In this embodiment the description is given with respect to the serial data receiving device which includes the reception buffer register 302, the reception buffer counter 304, the byte setting register 501, and the comparator 502, but the transfer clock may be suspended to be outputted by resetting the reception permit bit by any other means.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A serial data receiving device, comprising:
   a first memory means for receiving and storing serial data from a data sending line and shifting the data bit by bit when receiving each one bit of the data and converting the serial data into parallel data when all the bits constituting the serial data are stored;
   a first detecting means coupled to the data sending line for detecting the the reception of the last bit of the serial data;

a second memory means coupled to the first detecting means for storing a reception permit signal allowing the serial data to be received, wherein the reception permit signal is enabled or disabled by the first detecting means; and a first control means coupled to the second memory means for controlling the reception of the serial data in accordance with the reception permit signal, wherein the first control means further comprises:

a signal generating means for generating a signal enabling the serial data receiving device to hand-shake with a transmitting device and outputting a hand-shake signal to the transmitting device when the reception permit signal is enabled.

2. The serial data receiving device according to claim 1, further comprising:

a third memory means for storing the parallel data obtained at the first memory means;

a second control means for controlling the operation of the third memory means in accordance with the result of the detection by the first detecting means;

a counting means for counting the number of bytes of the parallel data stored in the third memory means; and a decoding means for decoding a count value obtained by the counting means, wherein the second memory means is set or reset in accordance with a code from the decoding means.

3. The serial data receiving device according to claim 2, further comprising:

a fourth memory means for storing a preset number of bytes of parallel data and a comparing means for comparing the count value by the counting means and stored contents in the fourth memory means, wherein the second memory means controls the reception of the serial data in accordance with the stored content in the fourth memory means.

4. The serial data receiving device according to claim 1, wherein the first control means includes a second signal generating means for generating a transfer clock for transferring the serial data and outputting the transfer clock to the transmitting device.

5. The serial data receiving device according to claim 2, wherein the first control means includes a second signal generating means for generating a transfer clock for transferring the serial data and outputting the transfer clock to the transmitting device.

6. The serial data receiving device according to claim 3, wherein the first control means includes a second signal generating means for generating a transfer clock for transferring the serial data and outputting the transfer clock to the transmitting device.

7. A serial data transfer apparatus comprising a serial data transmitting device for transmitting serial data and a receiving device for receiving the transmitted serial data, wherein the receiving device includes:

a first memory means for receiving and storing serial data from a data sending line and shifting the data bit by bit when receiving each one bit of the data and converting the serial data into parallel data when all the bits constituting the serial data are stored;

a first detecting means coupled to the data sending line for detecting the the reception of the last bit of the serial data;

a second memory means coupled to the first detecting means for storing a reception permit signal allowing the serial data to be received, wherein the reception permit signal is enabled or disabled by the first detecting means; and a first control means coupled to the second memory means for controlling the reception of the serial data in accordance with the reception permit signal, wherein the first control means further comprises:

a signal generating means for generating a signal enabling the serial data receiving device to hand-shake with a transmitting device and outputting a hand-shake signal to the transmitting device when the reception permit signal is enabled.

8. The serial data transfer apparatus according to claim 7, wherein the receiving device further includes:

a third memory means for storing the parallel data obtained at the first memory means;

a second control means for controlling the operation of the third memory in accordance with the result of the detection by the first detecting means;

a counting means for counting the number of bytes of the parallel data stored in the third memory means; and a decoding means for decoding a count value obtained by the counting means, wherein the second memory means stores the reception permit signal set or reset in accordance with a code from the decoding means.

9. The serial data transfer apparatus according to claim 8, wherein the receiving device further includes:

a fourth memory means for storing a preset number of bytes of parallel data; and a comparing means for comparing the count value by the counting means and stored contents in the fourth memory means, wherein the second memory means controls the reception of the serial data in accordance with the stored content in the fourth memory means.

10. The serial data transfer apparatus according to claim 7, wherein the first control means includes a second signal generating means for generating a transfer clock for transferring the serial data and outputting the transfer clock to the transmitting device.

11. The serial data transfer apparatus according to claim 8, wherein the first control means includes a second signal generating means for generating a transfer clock for transferring the serial data and outputting the transfer clock to the transmitting device.

12. The serial data transfer apparatus according to claim 9, wherein the first control means includes a second signal generating means for generating a transfer clock for transferring the serial data and outputting the transfer clock to the transmitting device.

* * * * *